(12) United States Patent
Tsodik et al.

(10) Patent No.: US 10,945,295 B2
(45) Date of Patent: Mar. 9, 2021

(54) ACCESS POINT DEVICE (AP) AND CLIENT DEVICE (STA) USING GROUPING OF TRANSMISSION PARAMETERS

(71) Applicant: HUAWEI TECHNOLOGIES CO., LTD., Guangdong (CN)

(72) Inventors: Genadiy Tsodik, Munich (DE); Shimon Shilo, Munich (DE); Doron Ezri, Munich (DE); Avi Weitzman, Munich (DE); Oded Redlich, Munich (DE)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/399,047

(22) Filed: Apr. 30, 2019

(65) Prior Publication Data

US 2019/0289634 A1 Sep. 19, 2019

Related U.S. Application Data

(63) Continuation of application No. PCT/EP2016/076502, filed on Nov. 3, 2016.

(51) Int. Cl.
*H04W 74/08* (2009.01)
*H04W 74/00* (2009.01)

(52) U.S. Cl.
CPC ....... *H04W 74/085* (2013.01); *H04W 74/006* (2013.01); *H04W 74/0833* (2013.01)

(58) Field of Classification Search
CPC ............. H04W 74/085; H04W 74/006; H04W 74/0833; H04B 7/0613; H04L 69/323; H04L 1/0643; H04L 29/08

(Continued)

(56) References Cited

U.S. PATENT DOCUMENTS 10,555,241 B2 * 2/2020 Selander .............. H04W 12/04
2014/0160930 A1 * 6/2014 Kwon .................. H04W 16/26
370/235

(Continued)

FOREIGN PATENT DOCUMENTS

EP 0993214 A1 * 4/2000 ........ H04W 74/0875
EP 0993214 A1 4/2000

(Continued)

OTHER PUBLICATIONS

Gouqing Li et al. Group based OFDMA Random Access, DensiFi, , pp. 18, May 6, 2015 (Year: 2015).*

(Continued)

*Primary Examiner* — Afsar M Qureshi
(74) *Attorney, Agent, or Firm* — Womble Bond Dickinson (US) LLP

(57) ABSTRACT

The disclosure relates to an access point device (AP) for communicating with a client device (STA). The AP may include a transceiver configured to transmit a first data packet indicating a set of groups, wherein each group of the set of groups is associated with a specific set of transmission parameters. The transceiver of the AP may also be configured to transmit a second data packet indicating an allocation for at least part of the groups. Furthermore, the transceiver of the AP may also be configured to receive a response frame using at least part of random access (RA) resources selected by the STA for the at least part of the groups.

18 Claims, 9 Drawing Sheets

(58) Field of Classification Search
USPC .................................................. 370/329, 355
See application file for complete search history.

(56) References Cited

U.S. PATENT DOCUMENTS

| | | | | |
|---|---|---|---|---|
| 2015/0063233 A1* | 3/2015 | Choi | ................. | H04W 72/0446 |
| | | | | 370/329 |
| 2016/0113034 A1* | 4/2016 | Seok | ..................... | H04W 74/04 |
| | | | | 370/329 |
| 2016/0255656 A1* | 9/2016 | Lou | ........................... | H04L 1/16 |
| | | | | 370/335 |
| 2017/0272138 A1* | 9/2017 | Chun | ...................... | H04L 29/08 |
| 2018/0160453 A1 | 6/2018 | Lee et al. | | |

FOREIGN PATENT DOCUMENTS

| | | | | | |
|---|---|---|---|---|---|
| EP | 2670206 A1 * | 12/2013 | ........ | H04W 74/0833 |
| EP | 2670206 A1 | 12/2013 | | |
| WO | 20081095941 A1 | 8/2008 | | |
| WO | WO-2008095941 A1 * | 8/2008 | .......... | H04W 72/087 |
| WO | WO-2016028131 A1 * | 2/2016 | .......... | H04L 1/0643 |
| WO | 2016/167579 A1 | 10/2016 | | |

OTHER PUBLICATIONS

Genadiy Tsodik et al. Flexible Control Allocation (FCA) for 802.11ax, DensiFi, May 5, 2016. total 12 pages.
Guoqing Li et al. Group-based OFDMA Random Access, DensiFi, May 6, 2015. total 18 pages.
Laurent Cariou et al. Short UL MU feedback mechanism, DensiFi, May 10, 2016. total 14 pages.

* cited by examiner

ACCESS POINT DEVICE (AP) AND CLIENT DEVICE (STA) USING GROUPING OF TRANSMISSION PARAMETERS

CROSS-REFERENCE TO RELATED APPLICATIONS

This application is a continuation of International Application No. PCT/EP2016/076502, filed on Nov. 3, 2016. The disclosures of the aforementioned application is hereby incorporated by reference in its entireties.

TECHNICAL FIELD

The present disclosure relates to an access point device (AP) and a client device (STA) transmitting and receiving data packets indicating groups associated with specific transmission parameters. The disclosure further relates to Random Access (RA) procedures, in particular according to the 802.11ax WiFi standard, for signaling RA resources between APs and STAs. The disclosure particularly relates to an efficient orthogonal frequency-division multiple access (OFDMA) physical layer device (PHY) based random access for a dense network.

BACKGROUND

In 802.11ax standard development, Random Access (RA) should be designed to allow a large number of STAs to transmit a RA request with reasonable complexity in terms of time and frequency resources.

There are two main trends currently discussed in standard development process: PHY based RA and MAC (Medium Access Controller) based RA. MAC based RA translates into a direct transmission of RA data, where the resources are allocated to a large number of STAs and each STA can choose randomly an available resource to transmit on. PHY based RA 100 as shown in FIG. 1 is performed in two steps: 1) Trigger Frame for RA (TFR) 101 is a frame that indicates that RA should be transmitted in the next uplink frame (including description of allocated resources). When TFR 101 is sent by AP, STA responds with a single bit indication of RA request 102. 2) In order to complete the RA procedure an additional TFR 104 is sent and STA responds with RA data transmission 105. After completion of these two steps AP transmits a trigger frame (TF) 106 and STA transmits data 107.

Although PHY RA can be more efficient in some scenarios, in dense network this solution is not efficient enough. Random Access procedure can require many resources, especially in dense network scenarios. Current discussions in the 802.11ax upcoming standard introduce several types of Random Access procedure. However, the required time and frequency resources are still too high to provide an efficient solution to a large number of STAs. Moreover, in some Random Access solutions the same resources are allocated for multiple clients and thus collision probability is very high.

When the number of STAs is large the probability of collision is extremely high and may lead to a very inefficient RA procedure. Moreover, the additional data required to indicate which allocation is requested 103 is a large overhead which makes both MAC and PHY RA procedures much longer in terms of time duration as shown in FIG. 1. Hence, both options have no practical solution for a very dense network.

SUMMARY

It is an object of the present application to provide a concept for an efficient communication initiation, in particular for a RA procedure, between an AP and a STA, in particular in dense network scenarios where the number of STAs is large.

This object is achieved by the features of the independent claims. Further implementation forms are apparent from the dependent claims, the description and the figures.

A central idea of the present application is to reduce collision probability by allocating dedicated resources to a specific group of STAs, while the rest of the STAs can choose from the rest of the resources. For example, if every STA has a dedicated resource, the probability of a collision is zero. This central idea is used with specific adaptation for RA purposes. RA groups are defined, where each group has a specific set of transmission parameters associated with this group. Different RA resources can be allocated for each RA group. Each STA may choose an RA group according to the transmission parameters associated with a specific RA group. Data resources will be allocated according to a RA group that was chosen for transmission of RA data.

The AP can choose different criteria for group definition according to a network status and STAs that are currently associated with this AP. For example, possible criteria for group definition can be: Packet size or packet duration in time (a number of bits to be transmitted); Modulation and coding rate; Transmission scheme (special transmission techniques defined by standard); Number of antennas/streams; etc. Each group can be defined by a single criterion or by a combination thereof.

Such a novel technique improves the efficiency and minimizes the time required to complete a Random Access procedure along with lower collision probability.

The devices described herein may be applied, for example, in 802.11ax systems. However, the techniques, systems, and methods discussed herein are not limited to 802.11ax, and may also be used with other WiFi communication systems consistent with the discussion herein. In 802.11ax standard development, control mechanisms, like random access (RA), acknowledgment (ACK), association request etc., are applied immediately after a trigger frame (TF) that is transmitted by the access point, also referred hereinafter as access point device. Thus the stations (STAs), also referred hereinafter as client devices, wait for the AP to trigger them. A Trigger Frame may be followed by one or more uplink (UL) frames, where each frame comprises a control signal transmitted by one or more STAs.

The devices described herein may perform random access procedures. Random access (RA) is a procedure that allows client type communication devices to request from an access point (AP) type communication device resources for transmission by use of a resource request and by another procedure to initiate an association procedure with the AP. In other words, this mechanism is usually applied by the client devices that need to request the resources. The client devices can achieve an association with a specific AP. Currently, in the 802.11ax standard, RA is applied immediately after a trigger frame (TF), which is transmitted by the AP. Thus the client devices wait for AP to trigger them (indicate the existence of a random access opportunity). A TF frame may be followed by several RA opportunities. Within each opportunity, clients can try to access the channel. For doing so they contend with each other.

The devices described herein may be configured to communicate using MAC based RA. In this technique, the RA is transmitted as regular data, including payload, where each client allocates its transmission within a single resource unit (RU) as defined in 802.11ax. A RU is defined as a set of continuous subcarriers, e.g. 26, over some period of time. The AP can decide to provide more than one RA frame triggered by a single TF. The specific frame and the RU within the frame can be chosen in a random way by each client type communication device. No distinguishing between the non-associated client type communication devices and associated client type communication devices is introduced and all the client type communication devices that try to transmit an RA, are allowed to choose any time/frequency resources allocated for the current RA opportunity. A random access block typically comprises a plurality of frequency subcarriers and a plurality of time slots. A frequency section comprises at least one such frequency subcarrier but typically a plurality of neighboring (the spacing between two neighboring frequency subcarriers depends on what is defined by the underlying communication system) frequency subcarriers.

The devices described herein may be configured to communicate using PHY based RA. PHY based RA is transmitted as PHY signaling and does not include any higher layer (MAC or above) payload. Several communication techniques regarding PHY based RA, where the RA data is a simple PHY signaling that informs the AP that a specific client type communication device wants resources, are available. The RA data is thus very short and allows a higher number of client type communication devices to be allocated within a single RA frame.

The devices described herein may be configured to transmit and/or receive radio signals. Radio signals may be or may include radio frequency signals radiated by a radio transmitting device (or radio transmitter or sender) with a radio carrier frequency lying in a range of about 3 kHz to 300 GHz. The frequency range may correspond to frequencies of alternating current electrical signals used to produce and detect radio waves.

The devices described herein may be applied in OFDM and OFDMA systems. OFDM and OFDMA are schemes for encoding digital data on multiple carrier frequencies. A large number of closely spaced orthogonal sub-carrier signals may be used to carry data. Due to the orthogonality of the sub-carriers crosstalk between sub-carriers may be suppressed.

In order to describe the present application in detail, the following terms, abbreviations and notations will be used:
  STA: Station, also referred to as client device
  AP: Access Point, also referred to as access point device
  RA: Random Access
  TF: Trigger Frame
  TFR: Trigger Frame for RA
  OFDM: Orthogonal Frequency Division Multiplexing
  OFDMA: Orthogonal Frequency Division Multiple Access
  UL: Uplink
  DL: Downlink
  PHY: Physical layer (device)
  MAC: Medium Access Controller
  MCS: Modulation and Coding Scheme According to a first aspect, an embodiment of the present application relates to an access point device (AP) for communicating with a client device (STA), the AP comprising: a transceiver configured to: transmit a first data packet indicating a set of groups, wherein each group is associated with a specific set of transmission parameters, transmit a second data packet indicating an allocation for at least part of the groups; and receive a response frame using at least part of random access (RA) resources selected by the STA for the at least part of the groups.

Such an AP indicating a grouping of transmission parameters to the STA reduces collision probability and thus reduces time required for RA procedure. Smart grouping allows collision probability management according to network requirements. Using transmission parameters for group definition allows reduction of RA data and thus reduces overall time of RA procedure.

In a first possible embodiment of the AP according to the first aspect, the AP comprises a controller configured to allocate different RA resources for each group.

Allocating different RA resources for each group provides the advantage that competition of STAs using transmission parameters of a first group with STAs using transmission parameters of a second group can be avoided, thereby reducing collision probability.

In a second possible embodiment of the AP according to the first aspect as such or according to the first embodiment of the first aspect, the controller is configured to allocate RA resources for transmission of RA data according to the at least part of RA resources used by the STA.

Allocating RA resources for transmission of RA data according to the (at least part of) RA resources used by the STA provides an easy allocation mechanism for the RA resources.

In a third possible embodiment of the AP according to the first aspect as such or according to any one of the preceding embodiments of the first aspect, the set of groups is based on at least one of the following criteria: number of bits to be transmitted, modulation and coding rate, transmission scheme, number of antennas and/or data streams.

This provides the advantage that the grouping can be flexible adapted to the required transmission parameters. This can be performed at run-time or the grouping can be predetermined, e.g. from off-line trials.

In a fourth possible embodiment of the AP according to the first aspect as such or according to any one of the preceding embodiments of the first aspect, the transceiver is configured to transmit the second data packet by using a trigger frame for RA (TFR).

This provides the advantage that the TFR frame can be according to the definition of the standard, e.g. IEEE 802.11ax. I.e., the standard can be reused when only adding the first data packet with the definition of the set of groups.

In a fifth possible embodiment of the AP according to the first aspect as such or according to any one of the preceding embodiments of the first aspect, the transceiver is configured to operate according to a MAC based RA procedure or according to a PHY based RA procedure.

This provides the advantage that existing techniques for MAC based RA procedure or PHY based RA procedure can be reused with slight modifications with respect to the definitions of the groups of transmission parameters.

According to a second aspect, an embodiment relates to a client device (STA) for communicating with an access point device (AP), the STA comprising: a transceiver, configured to: receive from the AP a first data packet indicating a set of groups wherein each group is associated with a specific set of transmission parameters; receive from the AP a second data packet indicating an allocation for at least part of the groups; and a controller, configured to select random access (RA) resources for the at least part of the groups and to control the transceiver transmitting a response frame using at least part of the RA resources allocated for the at least part of the groups.

Such a STA receiving an indication of a grouping of transmission parameters from the AP reduces collision probability and thus reduces time required for RA procedure. Smart grouping allows collision probability management according to network requirements. Using transmission parameters for group definition allows reduction of RA data and thus reduces overall time of RA procedure.

In a first possible embodiment of the STA according to the second aspect, the transceiver is configured to receive the second data packet as trigger frame for RA (TFR) and/or to transmit the response frame as RA request.

This provides the advantage that the TFR frame and/or the RA request can be according to the definition of the standard, e.g. IEEE 802.11ax. I.e., the standard can be reused when only adding the indication from the AP with the definition of the set of groups.

In a second possible embodiment of the STA according to the second aspect as such or according to the first embodiment of the second aspect, the controller is configured to select RA resources for a specific group based on the specific set of transmission parameters associated with the specific group.

Selecting RA resources for a specific group based on the specific set of transmission parameters associated with the specific group provides the advantage that competition of STAs using transmission parameters of a first group with STAs using transmission parameters of a second group can be avoided, thereby reducing collision probability.

In a third possible embodiment of the STA according to the second aspect as such or according to any one of the preceding embodiments of the second aspect, the controller is configured to control the transceiver according to a MAC based RA procedure or according to a PHY based RA procedure.

This provides the advantage that existing techniques for MAC based RA procedure or PHY based RA procedure can be reused with slight modifications with respect to the definitions of the groups of transmission parameters.

In a fourth possible embodiment of the STA according to the third embodiment of the second aspect, the transceiver is configured for a MAC based RA procedure to transmit both, the RA Request and data by using the selected RA resources.

This provides the advantage that a number of data packets exchanged between STA and AP can be reduced, thereby improving efficiency.

In a fifth possible embodiment of the STA according to the third embodiment of the second aspect, the transceiver is configured for a PHY based RA procedure to transmit the RA Request using a single bit indication and to transmit data by using the selected RA resources.

This provides the advantage that transmitting the RA Request by using a single bit indication reduces collision probability due to the short time required for transmission.

According to a third aspect, an embodiment relates to a transmission method for indicating a grouping of transmission parameters, the transmission method comprising: transmitting, by an access point device (AP), a first data packet indicating a set of groups, wherein each group is associated with a specific set of transmission parameters; transmitting, by the AP, a second data packet indicating an allocation for at least part of the groups; and receiving, by the AP, a response frame using at least part of RA resources selected by a client device (STA) for the at least part of the groups.

Such a transmission method indicating a grouping of transmission parameters reduces collision probability and thus reduces time required for RA procedure. Smart grouping allows collision probability management according to network requirements. Using transmission parameters for group definition allows reduction of RA data and thus reduces overall time of RA procedure.

In a first possible embodiment of the transmission method according to the third aspect, the transmission method comprises allocating, by the AP, different RA resources for each group.

Allocating different RA resources for each group provides the advantage that competition of STAs using transmission parameters of a first group with STAs using transmission parameters of a second group can be avoided, thereby reducing collision probability.

According to a fourth aspect, an embodiment relates to a reception method for receiving an indication of a grouping of transmission parameters, the reception method comprising: receiving, from an access point device (AP), a first data packet indicating a set of groups, wherein each group is associated with a specific set of transmission parameters; receiving, from the AP, a second data packet indicating an allocation for at least part of the groups; selecting RA resources for the at least part of the groups; and transmitting a response frame using at least part of the RA resources allocated for the at least part of the groups.

Such a reception method for receiving an indication of a grouping of transmission parameters reduces collision probability and thus reduces time required for RA procedure. Smart grouping allows collision probability management according to network requirements. Using transmission parameters for group definition allows reduction of RA data and thus reduces overall time of RA procedure.

BRIEF DESCRIPTION OF THE DRAWINGS

Further embodiments of the present application will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
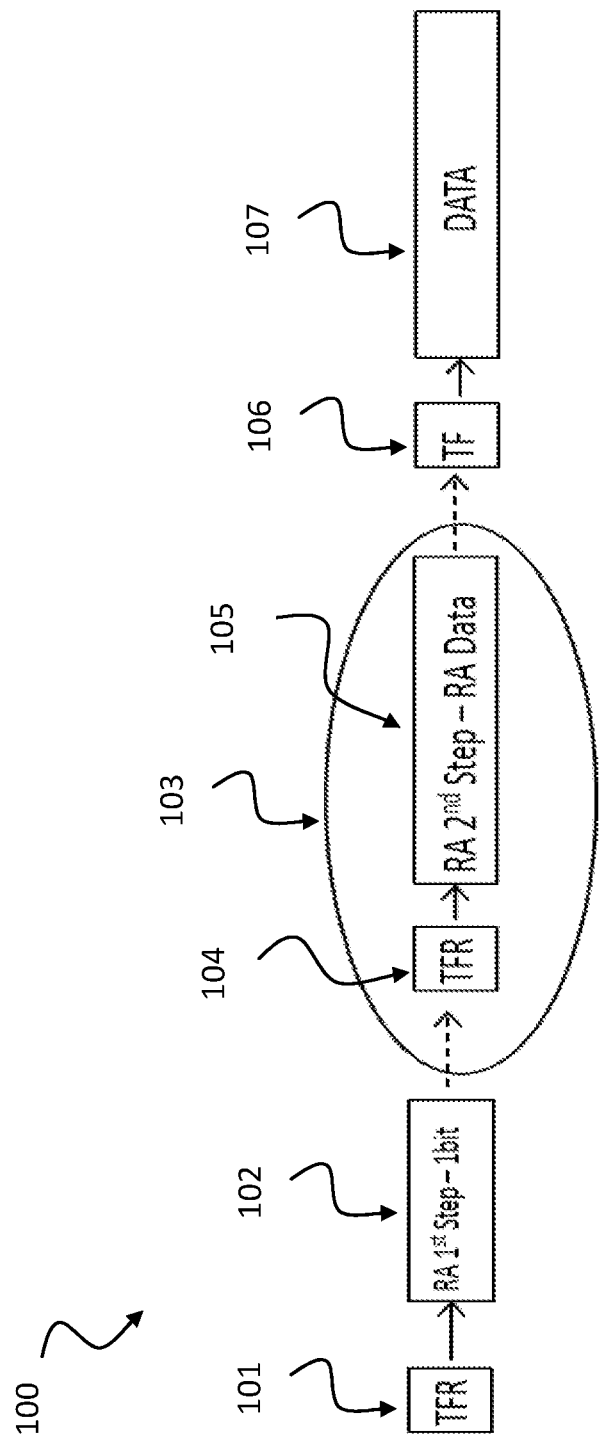
FIG. 1 shows a schematic diagram illustrating additional data overhead for PHY based RA 100.
Figure 2:
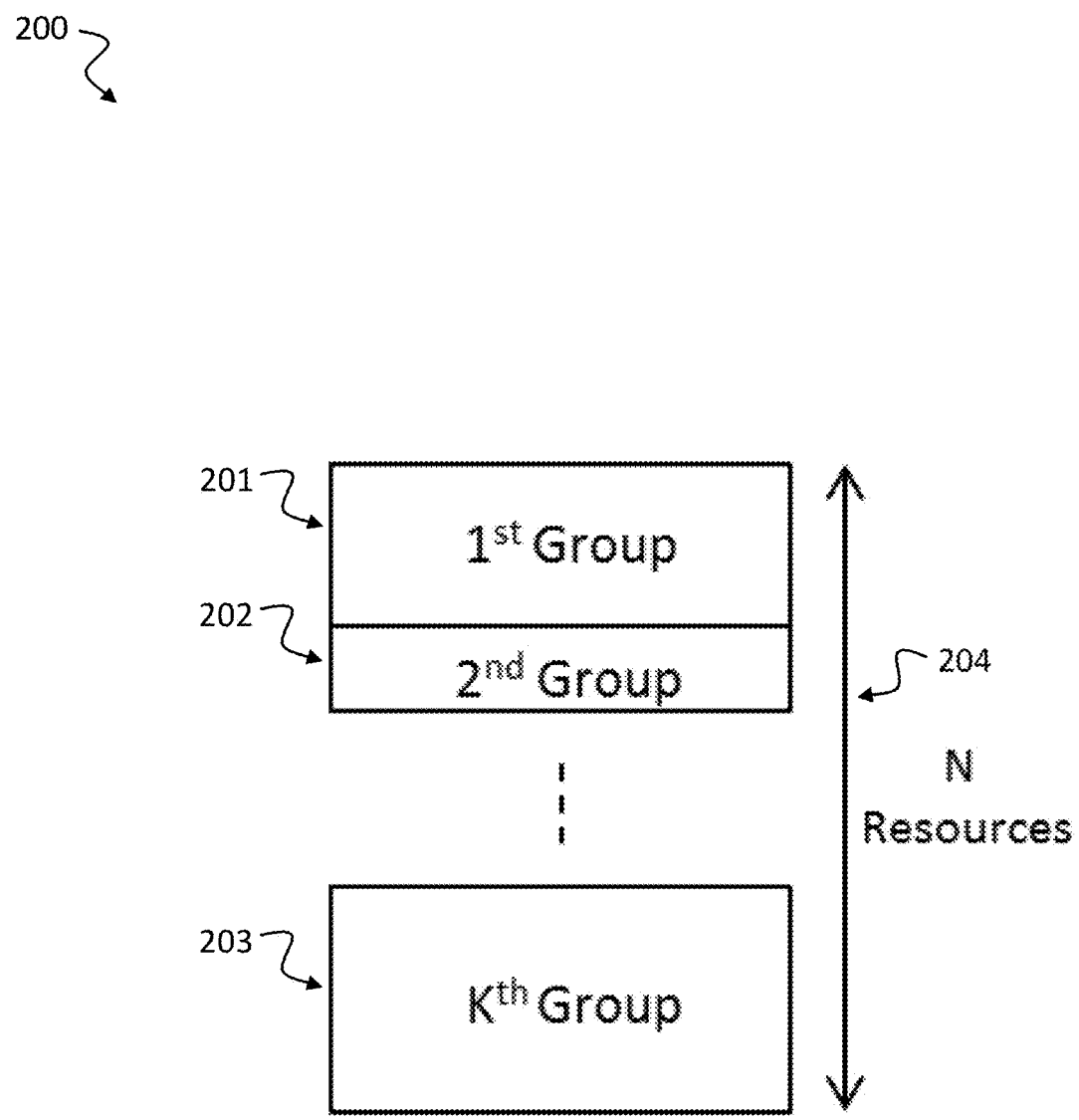
FIG. 2 shows a schematic diagram illustrating RA resources allocation with grouping 200 according to an embodiment.

FIG. 2 shows a schematic diagram illustrating RA resources allocation with grouping 200 according to an embodiment.

The figure shows an exemplary grouping where an integer number of N resources 204 are grouped in an integer number of K groups 201, 202, 203. For example, if there is a RA group with data payload limited by N bytes, every STA that transmits on the resource allocated for this group will be allocated data resources for up to N bytes. Using this method can avoid explicit indication of the required allocation and thus decreases an RA data payload and the time required to complete the RA procedure.

RA groups 201, 202, 203 can be defined, e.g. by the AP or predetermined by the network. Each group 201, 202, 203 can have a different set of transmission parameters associated with it, e.g. payload size, MCS (modulation and coding scheme), number of spatial streams, etc. Definition of groups can vary in time. Each STA can choose a single group to transmit RA data on the resources allocated to this group. Using such a grouping 200 of resources 204 or partitioning of resources 204 into a set of groups 201, 202, 203 reduces collision probability in RA and reduces time required to complete the RA procedure.

Figure 3:
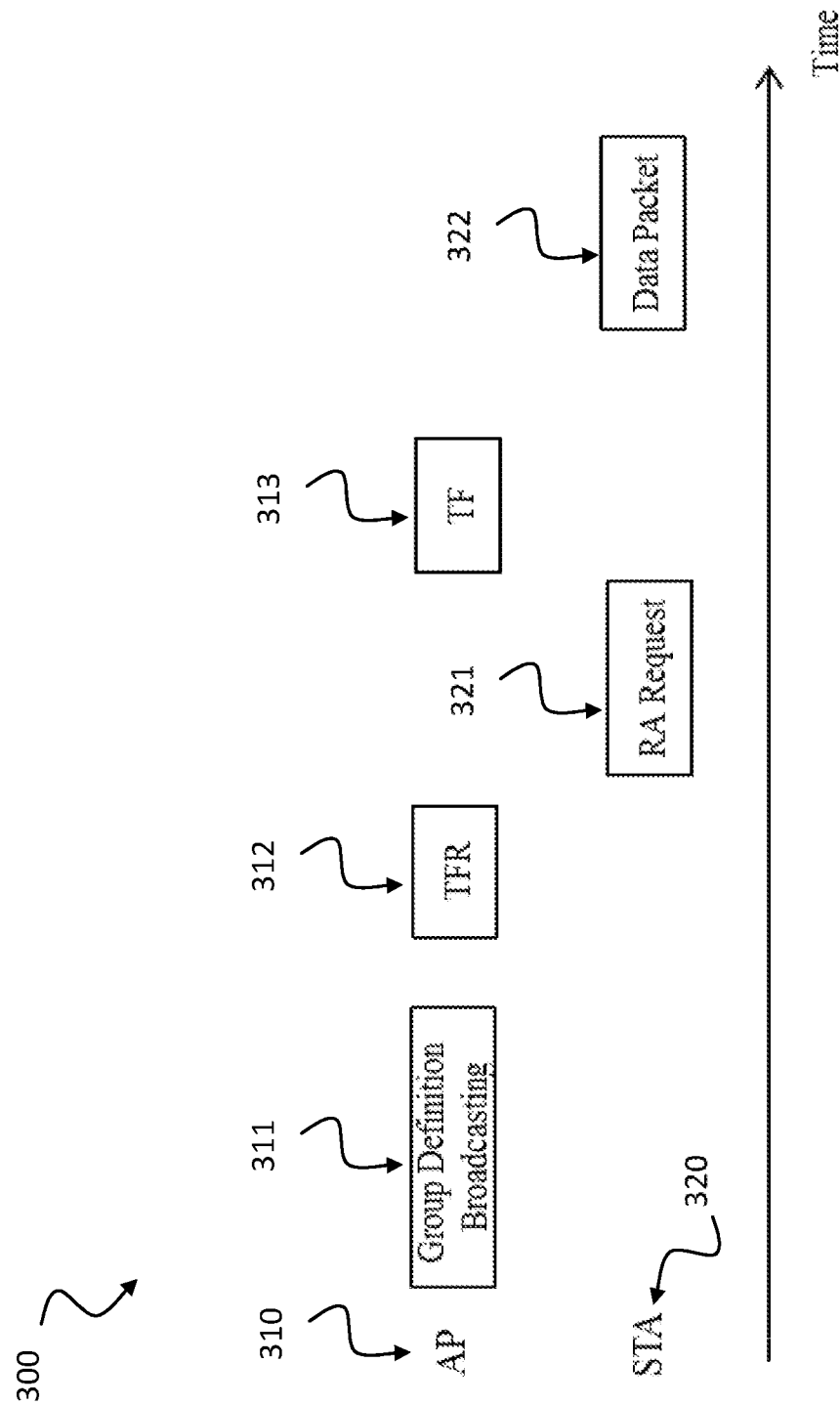
FIG. 3 shows a schematic diagram illustrating a time diagram of grouping for PHY based RA 300 according to an embodiment.

FIG. 3 shows a schematic diagram illustrating a time diagram of grouping for PHY based RA 300 according to an embodiment. The PHY based RA procedure 300 may include the following blocks: AP 310 defines a set of groups, e.g. a number of K groups as shown in FIG. 2. AP 310 advertises the definitions of the group within a (first) data packet, e.g. a broadcast packet 311. AP 310 transmits a (second) data packet, e.g. a TFR 312 with specific allocation of resources for the defined group or part of them. STA 320 chooses relevant resources to transmit on a response frame, e.g. a RA request 321 using the chosen resources. AP 310 transmits a (third) data packet, e.g. a TF 313 with allocation of the resources for STA 320 according to the resources that were used for RA request 321. STA 320 transmits a data packet 322.

Figure 4:
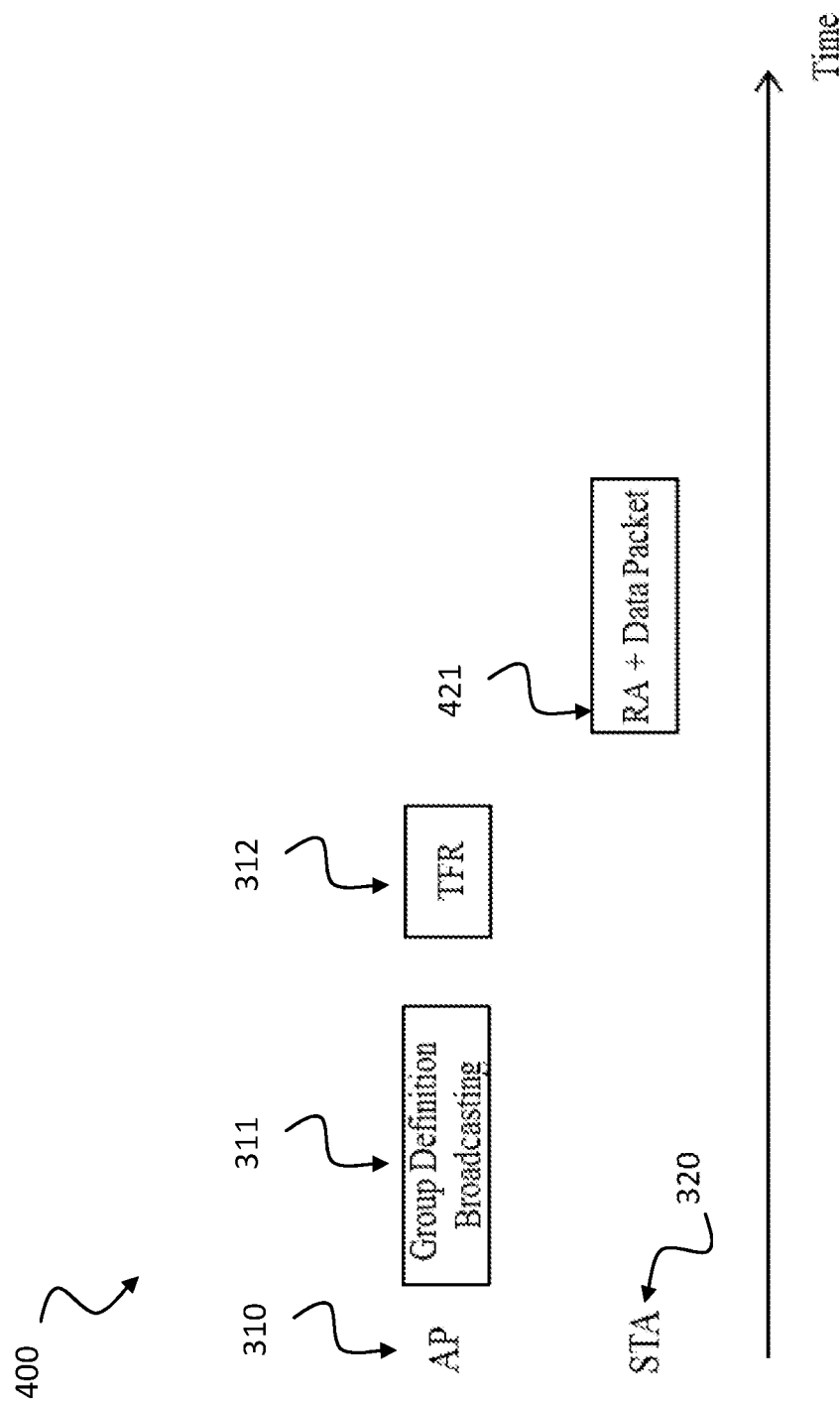
FIG. 4 shows a schematic diagram illustrating a time diagram of grouping for MAC based RA 400 according to an embodiment.

FIG. 4 shows a schematic diagram illustrating a time diagram of grouping for MAC based RA 400 according to an embodiment. The MAC based RA procedure 400 may include the following blocks: AP 310 defines a set of groups, e.g. a number of K groups as shown in FIG. 2. AP 310 advertises the definitions of the group within a (first) data packet, e.g. a broadcast packet 311. AP 310 transmits a (second) data packet, e.g. a TFR 312 with specific allocation of resources for the defined group or part of them. STA 320 chooses relevant resources to transmit on a response frame 421 with parameters defined for a specific group.

Figure 5:
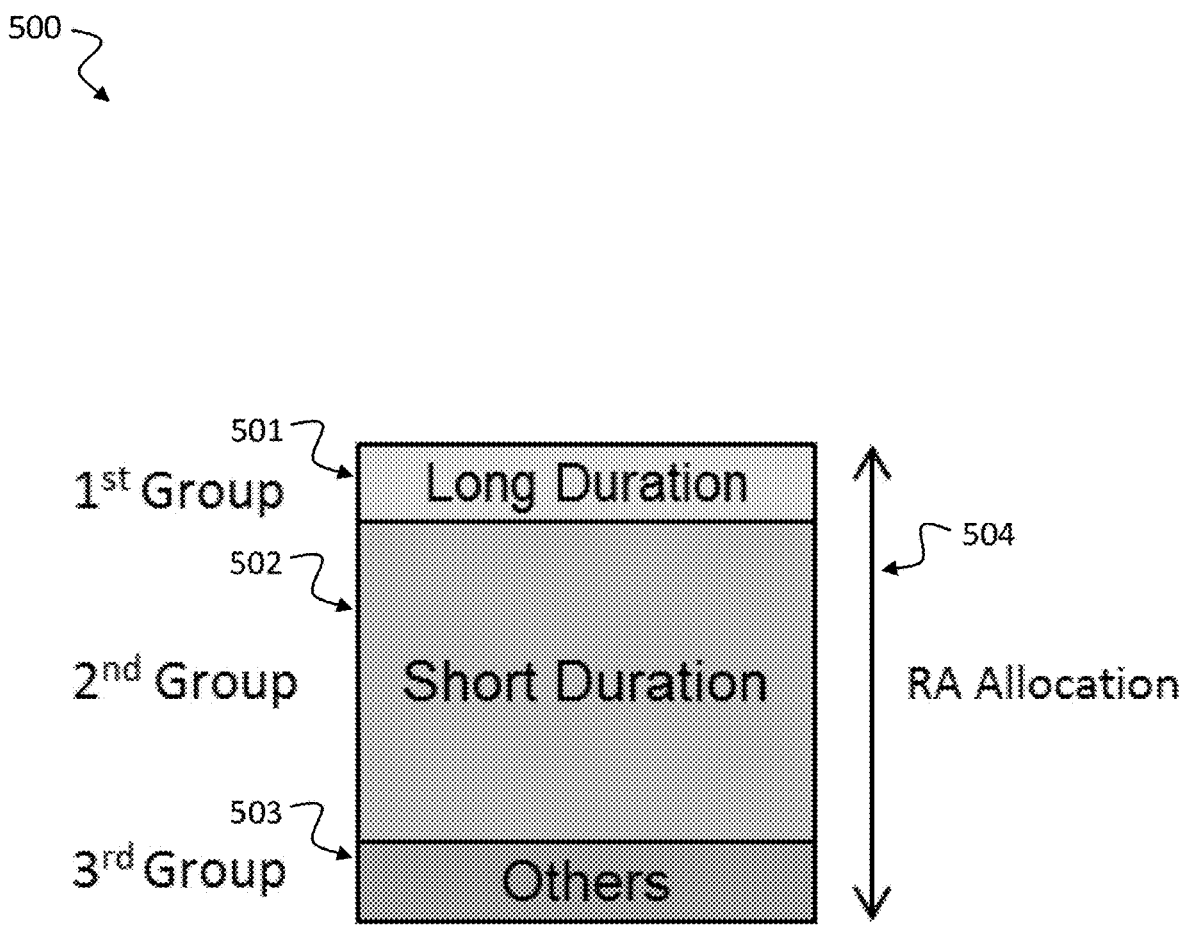
FIG. 5 shows a schematic diagram illustrating a grouping according to an embodiment.

FIG. 5 shows a schematic diagram illustrating a grouping according to an embodiment. FIG. 5 shows a scenario where three main types of STAs are associated with an AP: A lot of STAs (of a first type) transmit voice data, where a low amount of data has to be transmitted, thus short packets (short duration) with low modulation. Few STAs (of a second type) transmit video/images, where a large amount of data has to be transmitted, thus long packets (long duration) with high modulation. All the other STAs are assigned to a third type.

For this scenario, the AP may define three groups: a first group 502 for short duration data, a second group 501 for long duration data and a third (general) group 503 for all other kinds of data. According to a potential number of STAs in each group, in one implementation AP may allocate more resources 504 to the group of short duration 502 in order to accommodate a large number of STAs.

Figure 6:
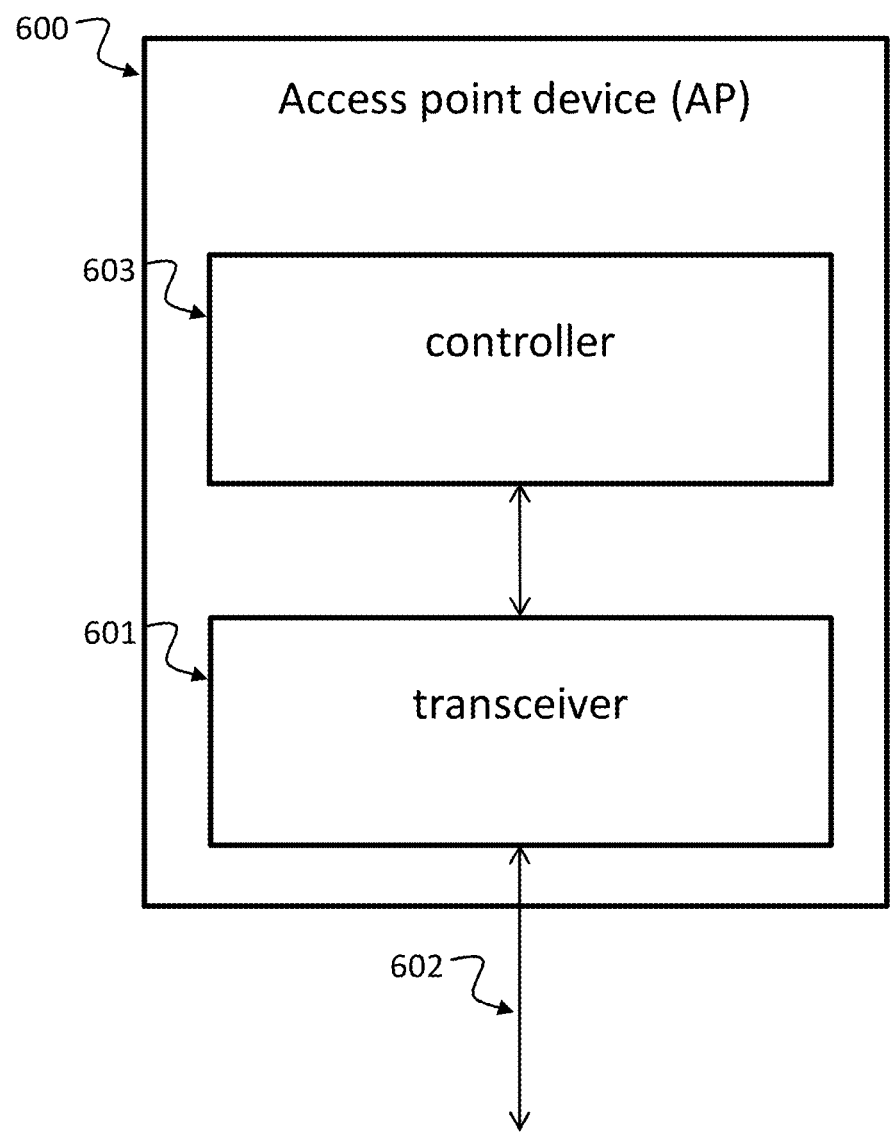
FIG. 6 shows a block diagram illustrating an AP 600 according to an embodiment.

FIG. 6 shows a block diagram illustrating an AP 600 for communicating with a STA according to an embodiment. The AP 600 includes a transceiver 601 and an optional controller 603. The transceiver 601 is configured to transmit 602 a first data packet, e.g. a data packet 311 as described above with respect to FIGS. 3 and 4 indicating a set of groups, e.g. a set of groups 200 as described above with respect to FIG. 2, wherein each group 201, 202, 203 is associated with a specific set of transmission parameters, e.g. packet size or packet duration in time such as a number of bits to be transmitted, modulation and coding rate, transmission scheme, number of antennas/streams; etc. The transceiver 601 is configured to transmit 602 a second data packet, e.g. a data packet 312 as described above with respect to FIGS. 3 and 4 indicating an allocation for at least part of the groups 201, 202, 203. The transceiver 601 is further configured to receive 602 a response frame, e.g. a frame 321, 421 as described above with respect to FIGS. 3 and 4, using at least part of random access (RA) resources selected by the STA for the at least part of the groups 201, 202, 203.

The controller 603 may allocate different RA resources 204 for each group 201, 202, 203 The controller 603 may allocate RA resources 204 for transmission of RA data according to the at least part of RA resources used by the STA. The set of groups 200 may be based on one or more of the following criteria: number of bits to be transmitted, modulation and coding rate, transmission scheme, number of antennas and/or data streams.

The transceiver 601 may transmit the second data packet 312 by using a trigger frame for RA (TFR), e.g. a TFR 312 as described above with respect to FIGS. 3 and 4. The transceiver 601 may operate according to a MAC based RA procedure 400, e.g. as described above with respect to FIG. 4 or according to a PHY based RA procedure 300, e.g. as described above with respect to FIG. 3.

Figure 7:
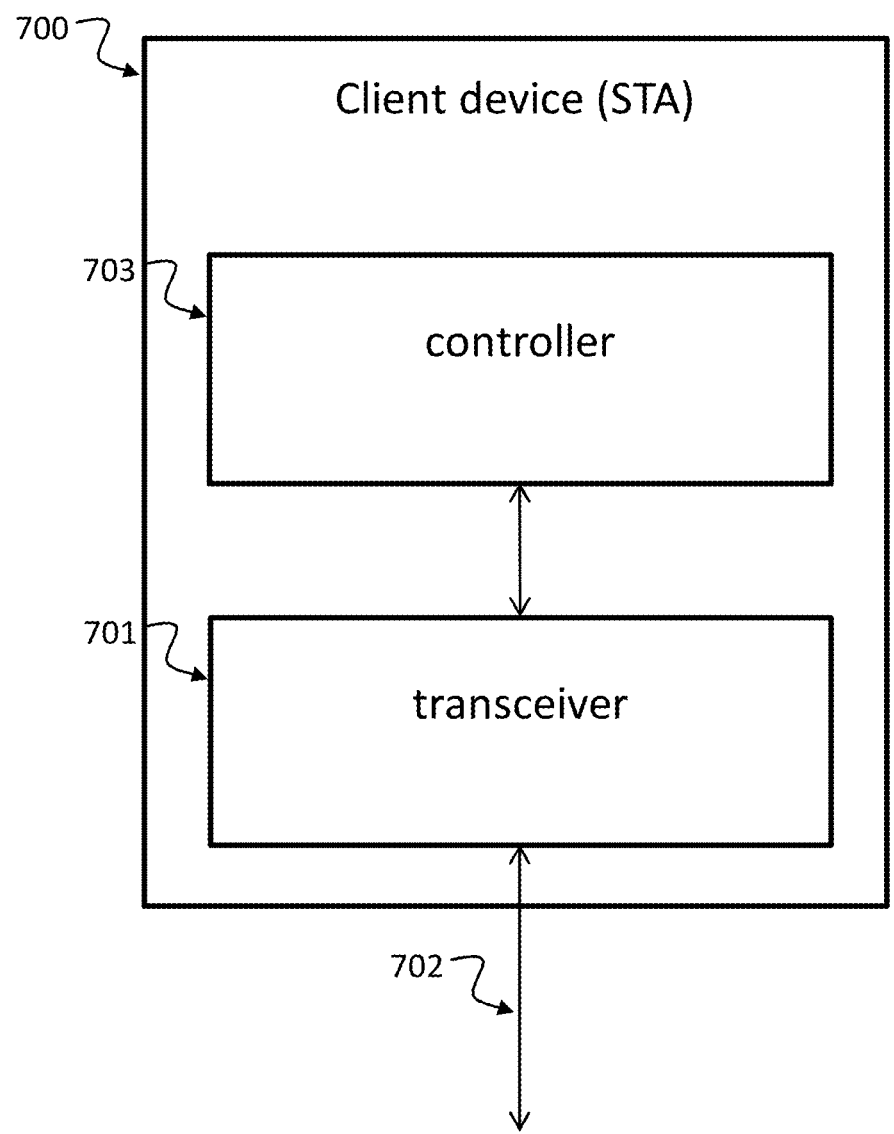
FIG. 7 shows a block diagram illustrating a STA 700 according to an embodiment.

FIG. 7 shows a block diagram illustrating a client device (STA) 700 for communicating with an access point device (AP) according to an embodiment. The STA 700 includes a transceiver 701 and a controller 703.

The transceiver 701 is configured to receive 702 from the AP a first data packet, e.g. a data packet 311 as described above with respect to FIGS. 3 and 4, indicating a set of groups, e.g. a set of groups 200 as described above with respect to FIG. 2, wherein each group 201, 202, 203 is associated with a specific set of transmission parameters, e.g. packet size or packet duration in time such as a number of bits to be transmitted, modulation and coding rate, transmission scheme, number of antennas/streams; etc. The transceiver 701 is configured to receive 702 from the AP a second data packet, e.g. a data packet 312 as described above with respect to FIGS. 3 and 4, indicating an allocation for at least part of the groups 201, 202, 203.

The controller 703 is configured to select random access (RA) resources for the at least part of the groups and to control the transceiver 701 transmitting 702 a response frame, e.g. a frame 321, 421 as described above with respect to FIGS. 3 and 4, using at least part of the RA resources allocated for the at least part of the groups 201, 202, 203.

The transceiver 701 may be configured to receive 702 the second data packet 312 as trigger frame for RA (TFR). The transceiver 701 may be configured to transmit 702 the response frame 321 as RA request.

The controller 703 may select RA resources 204 for a specific group, e.g. a group 201 shown in FIG. 2, based on the specific set of transmission parameters, e.g. the transmission parameters associated with long duration data such as video/images 501 associated with the specific group 201.

The controller 703 may control the transceiver 701 according to a MAC based RA procedure 400, e.g. as shown in FIG. 4. Alternatively, the controller 703 may control the transceiver 701 according to a PHY based RA procedure 300, e.g. as shown in FIG. 3.

The transceiver 701 may be configured for a MAC based RA procedure 400, e.g. as illustrated in FIG. 4, to transmit both, the RA Request and data 421 by using the selected RA resources. Alternatively, the transceiver may be configured for a PHY based RA procedure 300, e.g. as illustrated in FIG. 3, to transmit the RA Request 321 using a single bit indication and to transmit data 322 by using the selected RA resources.

Figure 8:
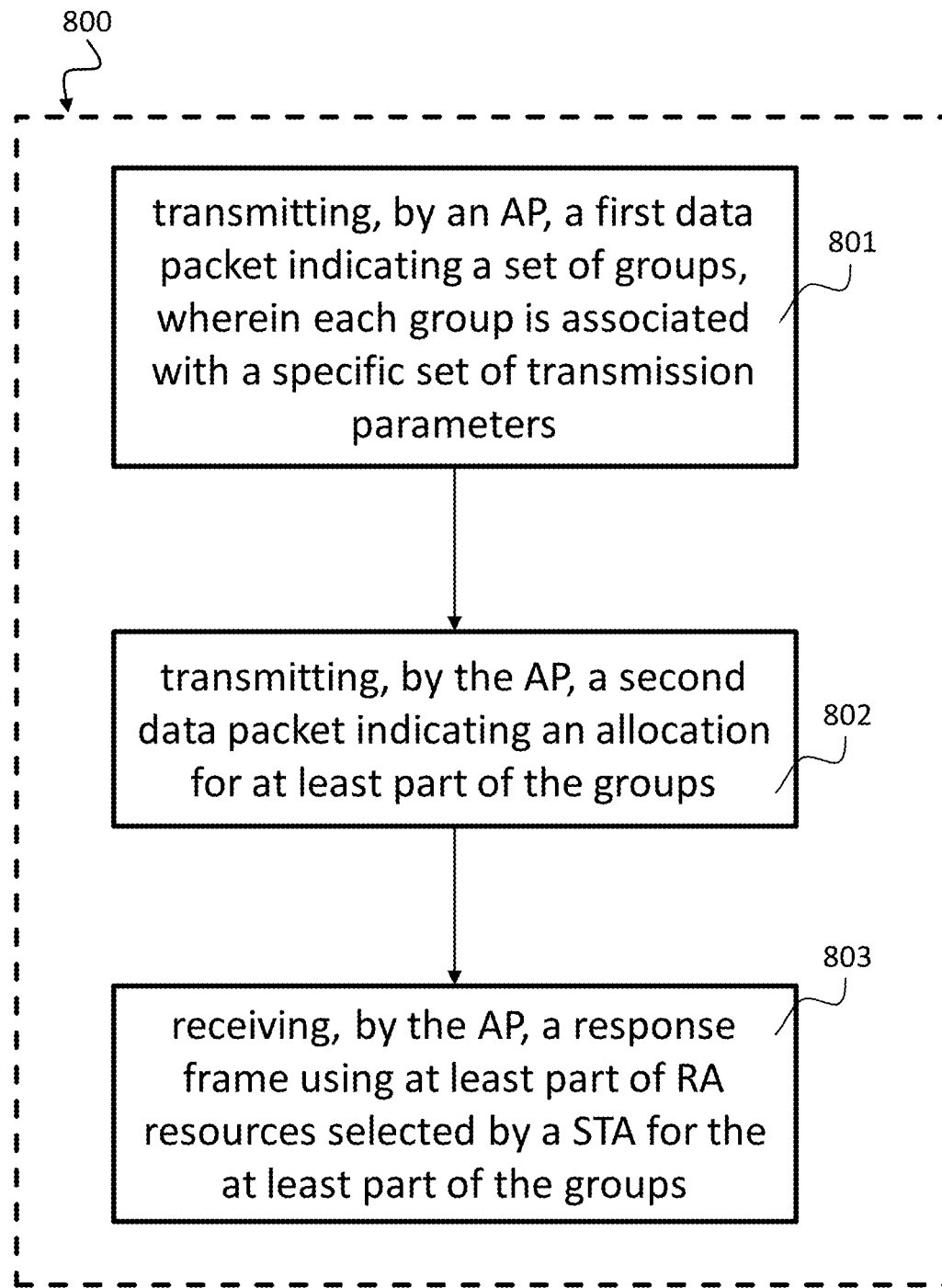
FIG. 8 shows a schematic diagram illustrating a transmission method 800 for indicating a grouping of transmission parameters according to an embodiment.

FIG. 8 shows a schematic diagram illustrating a transmission method 800 for indicating a grouping of transmission parameters according to an embodiment. The transmission method 800 includes the following blocks which may correspond to the respective functionalities of the transceiver 601 of the AP 600 described above with respect to FIG. 6: A first block 801 includes: transmitting, by an access point device (AP) 600, a first data packet 311 indicating a set of groups 200, wherein each group 201, 202, 203 is associated with a specific set of transmission parameters. A second block 802 includes: transmitting, by the AP 600, a second data packet 312 indicating an allocation for at least part of the groups 201, 202, 203. A third block 803 includes: receiving, by the AP 600, a response frame 321, 421 using at least part of random access (RA) resources selected by a client device (STA) 700 for the at least part of the groups 201, 202, 203.

The method 800 may also include other functionalities of the AP described above with respect to FIG. 6, for example: allocating, by the AP 600, different RA resources 204 for each group 201, 202, 203, etc.

Figure 9:
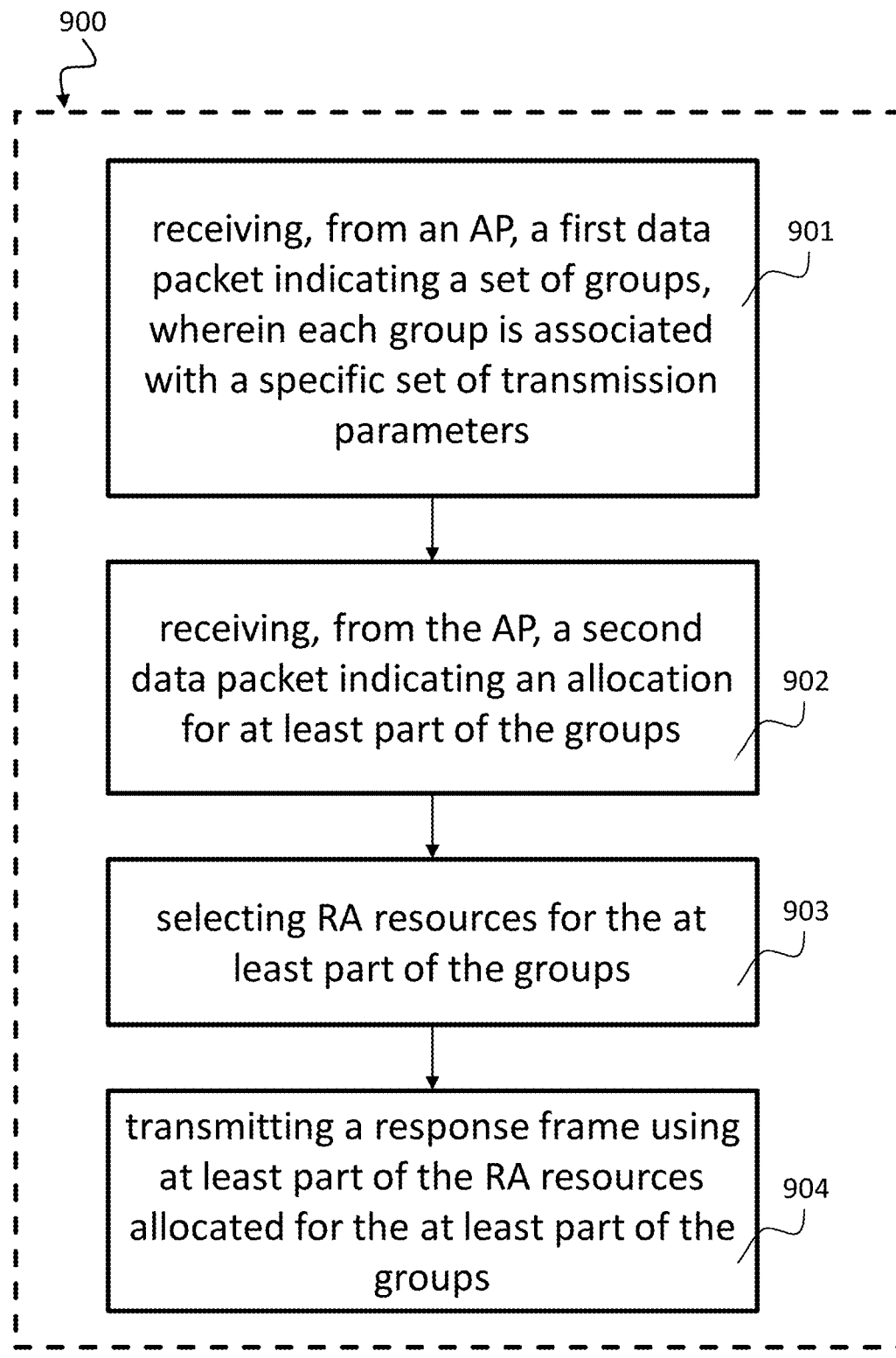
FIG. 9 shows a schematic diagram illustrating a reception method 900 for receiving an indication of a grouping of transmission parameters according to an embodiment.

FIG. 9 shows a schematic diagram illustrating a reception method 900 for receiving an indication of a grouping of transmission parameters according to an embodiment.

The reception method 900 includes the following blocks which may correspond to the respective functionalities of the transceiver 701 and the controller 703 of the STA 700 described above with respect to FIG. 7: A first block 901 includes: receiving, from an access point device (AP) 600, a first data packet 311 indicating a set of groups 200, wherein each group 201, 202, 203 is associated with a specific set of transmission parameters. A second block 902 includes: receiving, from the AP 600, a second data packet 312 indicating an allocation for at least part of the groups 201, 202, 203. A third block 903 includes: selecting 903 RA resources for the at least part of the groups 201, 202, 203. A fourth block 904 includes: transmitting a response frame 321, 421 using at least part of the RA resources allocated for the at least part of the groups 201, 202 and 203.

The method 900 may also include other functionalities of the STA described above with respect to FIG. 7, for example: receiving the second data packet as a trigger frame for RA and/or transmitting the response frame as RA request, etc.

The above-described grouping requires the AP to signal to the STAs what grouping is used; it may therefore become part of the standardization, e.g. of IEEE 802.11ax standard.

The present disclosure also supports a computer program product including computer executable code or computer executable instructions that, when executed, causes at least one computer to execute the performing and computing steps described herein, in particular the steps of the methods 800, 900 described above. Such a computer program product may include a readable non-transitory storage medium storing program code thereon for use by a computer. The program code may perform the performing and computing steps described herein, in particular the methods 800, 900 described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present application beyond those described herein. While the present application has been described with reference to one or more particular embodiments, those skilled in the art recognize that many changes may be made thereto without departing from the scope of the present application. It is therefore to be understood that within the scope of the appended claims and their equivalents, the present application may be practiced otherwise than as specifically described herein.

The invention claimed is:

1. An access point device (AP) for communicating with a client device (STA), the AP comprising:

a transceiver configured to:
  transmit a first data packet advertising definitions for a set of groups, wherein each group of the set of groups is defined by a specific set of transmission parameters associated with transmission of data by STAs within said each group,
  transmit a second data packet indicating an allocation of resources for at least part of the groups; and
  receive a response frame using at least part of random access (RA) resources allocated to a group selected by the STA based on a definition for the group satisfying transmission parameters of the STA for the at least part of the groups.

2. The AP of claim 1, further comprising:
a controller configured to:
allocate different RA resources for each group.

3. The AP of claim 1, wherein the controller is configured to:
  allocate RA resources for transmission of RA data according to the at least part of RA resources used by the STA.

4. The AP of claim 1, wherein the set of groups is based on at least one of the following criteria:
  number of bits to be transmitted,
  modulation and coding rate,
  transmission scheme,
  number of antennas or data streams.

5. The AP of claim 1, wherein the transceiver is configured to transmit the second data packet using a trigger frame for RA (TFR).

6. The AP of claim 1, wherein the transceiver is configured to operate according to a MAC based RA procedure or according to a PHY based RA procedure.

7. A client device (STA) for communicating with an access point device (AP), the STA comprising:
  a transceiver, configured to:
    receive from the AP a first data packet advertising definitions for a set of groups, wherein each group of the set of groups is defined by a specific set of transmission parameters associated with transmission of data by STAs within said each group, and
    receive from the AP a second data packet indicating an allocation of resources for at least part of the groups; and
  a controller, configured to:
    select random access (RA) resources allocated to a group based on a definition for the group satisfying transmission parameters of the STA, and to control the transceiver transmitting a response frame using at least part of the RA resources allocated for the selected group.

8. The STA of claim 7, wherein the transceiver is configured to receive the second data packet as trigger frame for RA (TFR) and/or to transmit the response frame as an RA request.

9. The STA of claim 7, wherein the controller is configured to select RA resources for a specific group based on the specific set of transmission parameters associated with the specific group.

10. The STA of claim 7, wherein the controller is configured to control the transceiver according to a MAC based RA procedure or according to a PHY based RA procedure.

11. The STA of claim 10, wherein the transceiver is configured for a MAC based RA procedure to transmit both an RA request and data using the selected RA resources.

12. The STA of claim 10, wherein the transceiver is configured for a PHY based RA procedure to transmit an RA request using a single bit indication and to transmit data using the selected RA resources.

13. A reception method for receiving an indication of a grouping of transmission parameters, the reception method comprising:
  receiving, from an access point device (AP), a first data packet advertising definitions for a set of groups, wherein each group of the set of groups is defined by a specific set of transmission parameters associated with transmission of data by STAs within said each group;
  receiving, from the AP, a second data packet indicating an allocation of resources for at least part of the groups;
  selecting RA resources allocated to a group based on a definition for the group satisfying transmission parameters of the STA, and
  transmitting a response frame using at least part of the RA resources allocated for the selected group.

14. The method according to claim 13, wherein the second data packet is a trigger frame for RA (TFR) and/or the response frame is an RA request.

15. The method according to claim 13, wherein the selecting RA resources for the at least part of the groups comprises:
  selecting the RA resources for a specific group based on the specific set of transmission parameters associated with the specific group.

16. The method according to claim 13, wherein the transmitting a response frame comprises:
  transmitting the response frame according to a MAC based RA procedure or according to a PHY based RA procedure.

17. The method according to claim 16, wherein the transmitting a response frame according to a MAC based RA procedure comprises:
  transmitting both an RA request and data by using the selected RA resources according to a MAC based RA procedure.

18. The method according to claim 16, wherein the transmitting a response frame according to a PHY based RA procedure comprises:
  transmitting an RA request using a single bit indication; and
  transmitting data by using the selected RA resources according to a PHY based RA procedure.

* * * * *